Aug. 8, 1950   W. S. LANDON   2,518,339
FLOW CONTROL MEANS
Original Filed Dec. 3, 1943   2 Sheets-Sheet 1
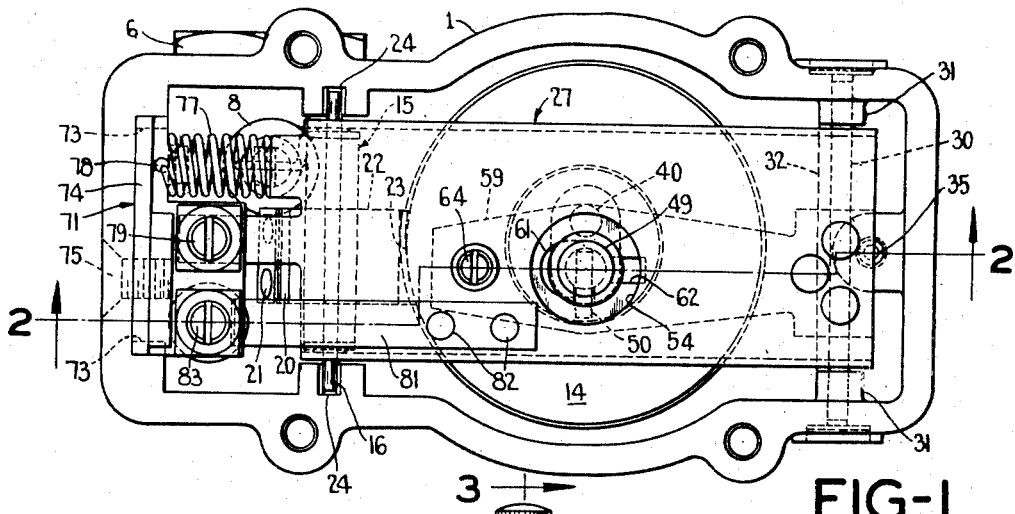
FIG.-1
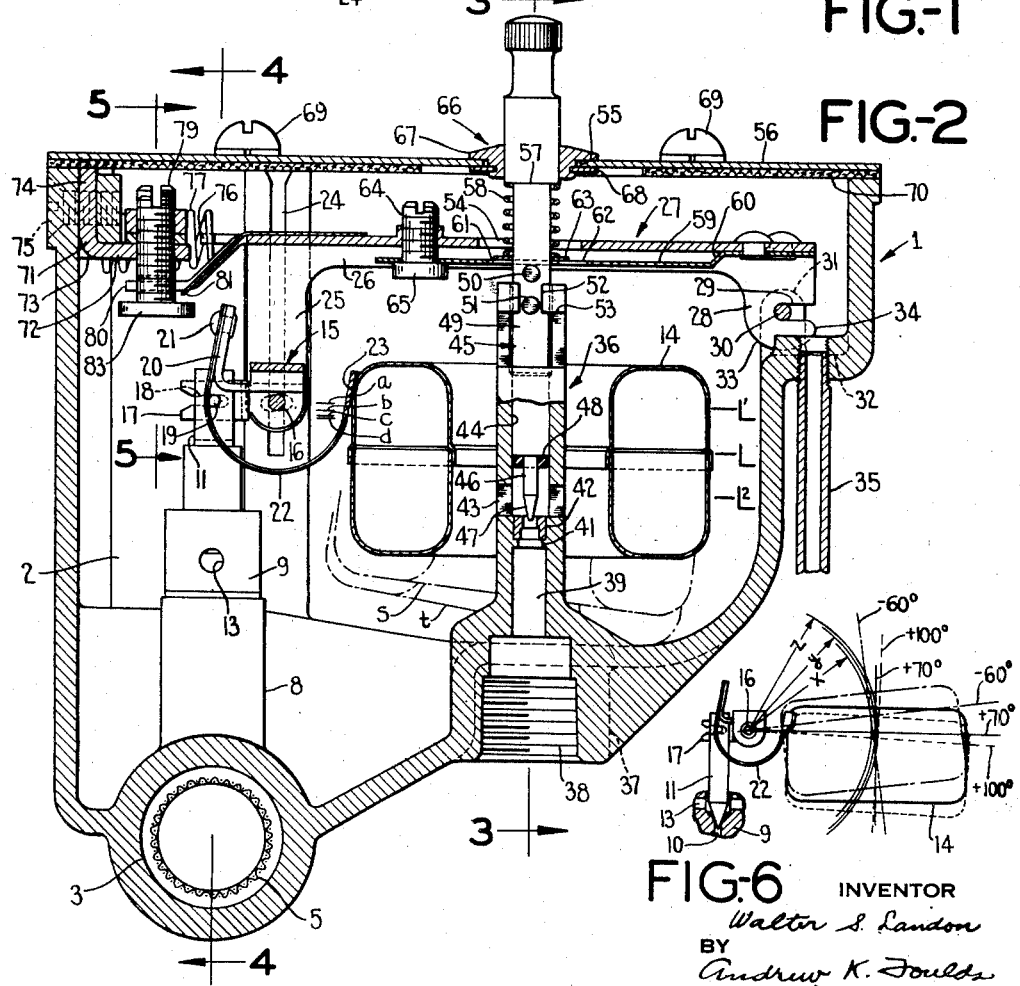
FIG.-2
FIG.-6
INVENTOR
Walter S. Landon
BY
Andrew K. Foulds
his ATTORNEY Aug. 8, 1950     W. S. LANDON     2,518,339
FLOW CONTROL MEANS
Original Filed Dec. 3, 1943     2 Sheets-Sheet 2
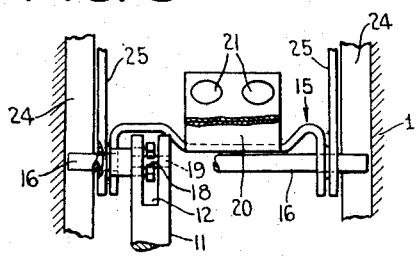
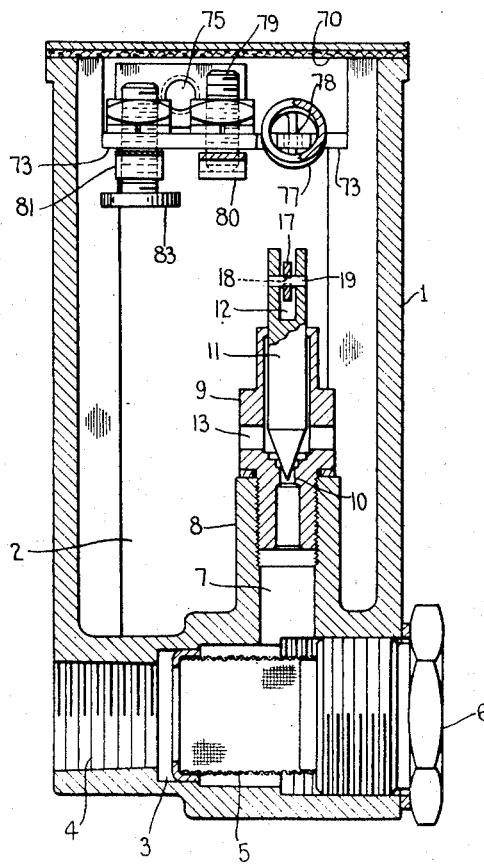
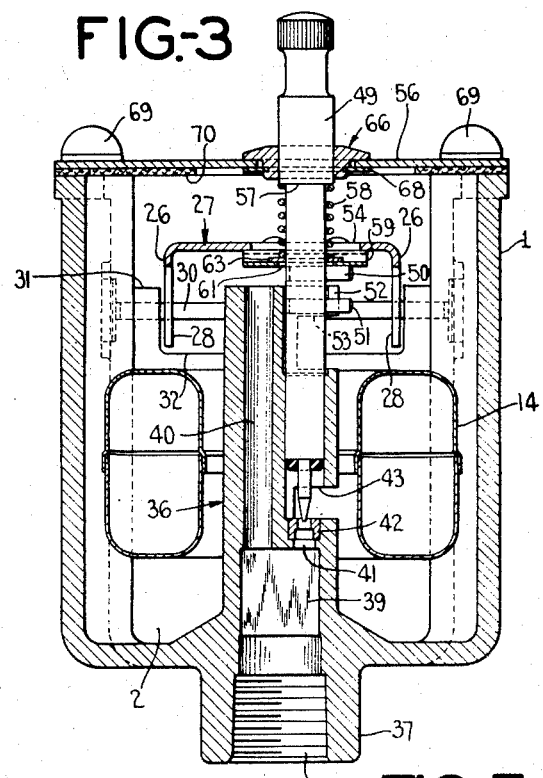
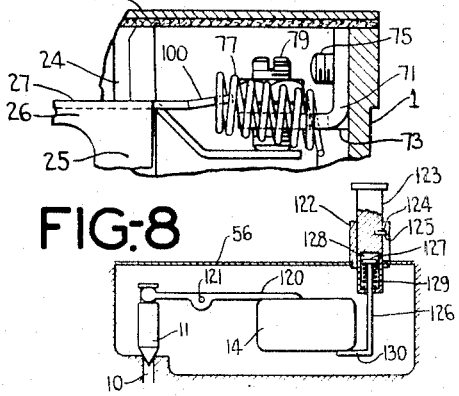
INVENTOR
Walter S. Landon
BY
Andrew K. Fouda
his ATTORNEY Patented Aug. 8, 1950

2,518,339

UNITED STATES PATENT OFFICE 2,518,339

FLOW CONTROL MEANS

Walter S. Landon, Detroit, Mich., assignor to Detroit Lubricator Company, Detroit, Mich., a corporation of Michigan Original application December 3, 1943, Serial No. 512,716, now Patent No. 2,427,059, dated September 9, 1947. Divided and this application September 12, 1945, Serial No. 615,875

3 Claims. (Cl. 137—21)

This invention relates to new and useful devices for controlling the flow of liquid and more particularly to constant liquid level devices adapted primarily for feeding liquid fuel to a gravity fed burner.

An object of the invention is to provide means to compensate for change in flow due to temperature change.

Another object is to overcome the wearing of movable parts which will result from jarring and oscillation of the device during times of nonuse such as will occur in shipment.

Another object is to provide means to control the liquid head on the outlet of the device in accordance with change in the effective area of the outlet port.

Another object is to provide means to lock the inlet and outlet valves in closed position.

Another object is to provide means to establish predetermined flow from the outlet.

Another object is to provide a device which can be readily assembled and disassembled in the field.

Another object is to provide means to prevent the undesirable admission of water or other liquid to the device.

The invention consists in the improved construction and combination of parts to be more fully described hereinafter and the novelty of which will be particularly pointed out and distinctly claimed.

In the accompanying drawings to be taken as a part of this specification, there are fully and clearly illustrated several preferred embodiments of the invention, in which drawings:

Figure 1 is a top plan view of the control device having the cover member removed to show internal structure;

Fig. 2 is a view in section on the line 2—2 of Fig. 1;

Fig. 3 is a view in section on the line 3—3 of Fig. 2;

Fig. 4 is a view in section on the line 4—4 of Fig. 2;

Fig. 5 is a detail view looking from left to right facing Fig. 2 and taken on the line 5—5;

Fig. 6 is a detail view showing the changed position of certain of the parts as a result of temperature change;

Fig. 7 is a detail view looking from left to right facing Fig. 4 and showing a modified form of control device, and Fig. 8 is a view in vertical section through the constant level casing with certain parts omitted and showing another form of locking means for the float and inlet valve.

Referring to the drawings by characters of reference, 1 designates generally a casing or container providing a constant liquid level chamber 2 having an inlet passageway 3 with a horizontal portion having an internally screw-threaded inlet portion 4 for connection to a supply tank, see Fig. 4. The horizontal portion contains a tubular strainer member 5 carried by a threaded plug 6 screwed into the horizontal passageway portion at its opposite end from the inlet portion 4. The passageway 3 has an upward extending portion 7 in a hollow boss or tube 8 positioned within the chamber 2 so that liquid must pass through the strainer member 5 during flow to the portion 7. Screw-threaded into the upper end of the boss 8 there is a guide and port member 9 having an inlet port and valve seat 10 and containing a needle valve 11 which extends upward beyond the member 9, where it is provided with an end slot 12. The member 9 has lateral outlet ports 13 above and on the outlet side of the valve seat and feeding into the chamber 2. Positioned within the chamber 2 there is a hollow annular float member 14 which may be of thin sheet metal and which is operatively conected to the inlet valve 11 by a resilient lever 15 having a resilient portion and fulcrumed on a pivot pin or shaft 16. The lever 15 has a bell crank portion with a substantially horizontal arm 17 having an end slot 18 with a flared or divergent opening and having a width to rotatably fit a cross pin 19 extending between and secured in the side walls of the valve slot 12. The slot 18 is of slightly reduced width adjacent and on the inward side of its flared end portion so that the pin 19 will not pass freely therethrough. Therefore, the side walls or arms of the slot 18 must be flexed slightly in order to remove the valve member 11 from the arm 17. The lever 15 has an upstanding arm 20 which is inclined at an angle of about 10° to a vertical plane through the shaft 16 or to a plane through the pin 19 and the longitudinal centerline of valve member 11 and which is positioned adjacent the said plane through the valve member pin 19 but intermediate the pin 19 and the shaft 16. Secured to the arm 20, as by rivets 21, and providing the resilient portion of lever 15, there is a U-shaped temperature responsive member 22 of bimetal having an intermediate substantially semi-circular portion and tangential end portions, one of the end portions lying and being secured against the arm 20 by the rivets 21. The member 22, which is preferably of about .015" metal thickness, has its lever secured end and semi-circular portions of bimetal and preferably has its other end portion 23 of a single sheet or piece of metal so that portion 23 will not warp upon temperature change. The portion 23 is preferably of the same metal as the float member 14 or of a metal having substantially the same coefficient of expansion as the metal of the float member 14. The portion 23 is welded or fused to the bimetal semi-circular portion and is secured to the float member 14 by solder or the like. Therefore, since the portion 23 is not flexed by temperature change, change of temperatures does not weaken the solder joint.

The end portions of the shaft 16 extend into vertical opposed slots 24 in vertical bosses projecting inward into the chamber 2 from the side walls of the casing 1, the shaft 16 substantially fitting the slots 24, so that the shaft 16 is held against lateral movement transversely to its longitudinal axis. The end portions of the shaft 16 extend through inclined substantially horizontal elongated apertures in parallel downward extending arms 25, see Figs. 2 and 5, projecting from the underside of parallel side flanges 26 of an adjustment and supporting lever 27. The side flanges 26 at the end of the lever 27, opposite the supporting members 25, have downward extending bearing ears 28 having substantially horizontal open bearing slots 29 therein opening through the end edges of the ears which face away from the members 25. The slots 29 receive a bearing shaft 30 secured at its ends in alined apertures through side walls of the casing 1 and through positioning bosses 31 projecting inward from the casing side walls. Positioned below the shaft 30 the casing 1 has a horizontal shelf or wall 32 which cooperates with the ears 28 to locate the slots 29 on the shaft 30, the lower edge portions 33 of the ears 28 being arcuate and serving as cams cooperable with the shelf 32, so that when the lever 27 is positioned for and moved into assembly into the casing 1, the engagement of the ear end portions 34 with the shelf 32 will guide and position the slots 29 to slide over or onto the shaft 30 as the lever 27 is rotated counterclockwise downward and simultaneously slid toward the right facing Fig. 2. Through the shelf 32 there is a vertical internally threaded aperture in which there is screw-threaded a downward extending overflow pipe 35 for outflow of liquid from the chamber 2 in the event the valve member 11 fails to seal the port 10. This pipe or tube 35 also functions normally as an atmospheric air inlet to the chamber 2 and, by having it open downwardly through the shelf 32, prevents the entrance of dirt, water or other foreign matter into the chamber 2.

Concentric with the float member 14 when it is in horizontal position, as in Fig. 2, there is an upstanding combined liquid outlet and gas vent member 36, of generally oval form in horizontal cross section, which extends upward from the bottom wall of the casing 1 and terminates adjacent the underside of the lever 27. Through the bottom wall of the casing and an external coupling boss 37, there is an outlet passageway 38 internally screw-threaded at its outer cylindrical end portion to receive a pipe or conduit to be connected to the fuel burner or other point of use of the liquid from chamber 2. Above the cylindrical outlet passageway portion, there is a transversely elongated portion 39, through the top wall of which open in substantially parallel vertical relation a vent passage 40 and an outlet port 41 having a valve seat member 42. Through the side wall of the member 36, at, but on the inlet side of the seat member 42, there is a horizontal substantially rectangular slot 43 providing a port for flow of liquid from the chamber 2 to the port 41 and forming part of the outlet passageway 38. The member 36 has, above the slot 43, a cylindrical guideway 44 in which there is positioned a longitudinally reciprocal metering valve 45 having, at its lower end, a cylindrical port closing portion 46 of reduced diameter to slidably fit the outlet aperture through the seat member 42. The valve portion 36 terminates in a downward tapered metering portion 47, which cooperates with the seat member aperture to control flow from the chamber 2. On the reduced end portion 46 there is a shut off disc or washer 48 engageable with the seat member 42 to seal the outlet passageway 38, the disc 48 preferably being of resilient rubber-like material, such as Ameripol. The washer 48, however, may be dispensed with when the control device is to be used in extremely low ambient temperatures at which the viscosity of the liquid would render the washer unnecessary. The stem 49 of the valve 45 slidably fits the guideway 44 and has projecting therefrom upper and lower, substantially horizontal and parallel, guide pins 50, 51 which are slidable into a bayonet type slot 52 in the upper end portion of the member 36. The slot 52 has downward facing locking shoulders 53 cooperable, upon rotation of the stem, with the upper circumferential edge of the pin 50 which provides an upward facing locking shoulder. The stem 49 extends upward through a circular opening 54 in and through the lever 27 and therebeyond through an aperture 55 through the cover member 56 of the casing 1. Within the casing 1 and above the lever 27, the stem 49 has a downward facing shoulder 57 against which abuts the upper end of a helical coil spring 58 surrounding the stem. Secured as by rivets to the underside of the web or base of the channel lever 27 at a point above the lever supporting shaft 30, there is a movable supporting member 59, preferably a leaf spring downwardly offset, as at 60, to lie substantially parallel to the lever 27. The leaf spring 59 extends longitudinally of the lever 27 to a point substantially midway between the metering valve stem 49 and the float supporting arms 25. Through the spring 59 there is an elongated aperture 61 of less width than the diameter of lever aperture 54 and having at its end toward the lever supporting shaft 30 a radial slot 62. The pins 50, 51 are of a length to pass readily through the lever aperture 54 and are of a diameter and length to pass readily through slot 62, so that the pins 50, 51 can be withdrawn upwardly through the slot 62 and the aperture 54. The lower end of the coil spring 58 seats on a washer or disc 63 which is of less diameter than the aperture 54 but which is of greater diameter than the width of the aperture 61, so that the side edge portions of the disc 63 seat on the leaf spring 59. The spring 58 is under compression and therefore pulls and holds the upper circumferential edge of the pin 50 into and in engagement with the underside of the leaf spring 59 at a side portion of the aperture 61, so that the metering valve 45 is movable with the lever 27. An adjustment screw 64 is adjustably screw-threaded in an aperture through the lever 27 and has, at its lower end, a head or lateral flange 65 on which the leaf spring 59 seats, the leaf spring 59 preferably being apertured to receive the screw 64. The leaf spring 59 is therefore held by the screw head 65 against downward movement relative to or away from the lever 27, but is free to be moved or flexed upward or toward its supporting lever 27, so that the valve member 46 can have upward movement relative to lever 27.

The valve stem 49 above the shoulder 51 has a sliding fit in a closure member or collar 66 which fits loosely for lateral play within the cover member aperture 55. The collar 66 has a circumferential flange 67 which extends beyond and overlies the edge of aperture 55 and seats on the top face of the cover member 56. The collar 66 is held in the aperture 55 by an annular washer or disc 68 which engages the under face of the cover member 56 and which is secured to the collar member, as, for example, by swaging over the under end portion of the collar member. The collar 66 being free to aline itself with the stem 49, permits the stem to move freely through the cover member 56 without binding against the side wall of the aperture, while maintaining a relatively tight fit in the collar member aperture which closes the cover member aperture, so that liquid cannot gain access to the chamber through the cover member aperture or around the stem 49. The cover member is preferably held in place on the casing by screws 69 tapped into the side walls of the casing 1. A gasket 70, sealing the joint between the cover member and casing, is also provided.

Secured to the end wall of the casing 1 opposite the lever supporting shaft 30 there is a supporting member 71 in the form of an angle bracket having a horizontal flange 72 extending toward the metering valve 45 and seating on upward facing shoulders or steps 73 on the internal wall of casing 1. The bracket 71 has an upstanding flange 74 which laterally abuts the inside face of the casing end wall and which is clamped and held thereagainst by a clamp screw 75. In overlying relation to the inlet valve 11, the lever 27 has a longitudinal extension 76 providing a spring receiving abutment portion which receives one end of a helical coil spring 77 having its other end located by and on a tongue projecting from the bracket flange 72. The spring 77 is removably secured to the bracket 71 by inserting an end portion of the spring through a bracket aperture, as at 78, so that the end turn of the spring is held in position on the bracket tongue. The spring 77 acts at an acute angle on and longitudinally of the lever 27 and is held under compression between the bracket flange 72 and the lever 27 and has its point of engagement with lever 27 movable over or through center upon upward and downward movement of the lever. The component of force of the spring 77 acting longitudinally of the lever 27 holds the inner ends of the slots 29 of the supporting ears 28 resiliently against the fulcrum shaft 30. In the upward position of the lever 27, the upward movement of the lever 27 by the upward component of force of the spring 77 is limited by a maximum fuel flow or high fire adjusting screw 79 which is adjustably screw-threaded through the bracket flange 72 and extends downward therefrom for engagement by the horizontal end portion of a downward offset arm 80 extending from the base or web of the lever 27. In the downward position of the lever 27, its downward movement is normally limited by a resilient stop member 81, preferably a leaf spring, which exerts a greater resisting force than the downward component of force of the spring 77 in its down position. The leaf spring 81 is riveted or otherwise secured at one end, as at 82, to the top face of the web of lever 27 and has its free end portion inclined and projecting downward at the side of the stop arm 80 for engagement with the top face of the head or flange of a low fuel flow or minimum fire adjustment member or screw 83 which is adjustably screw-threaded through the bracket flange 72 at one side of the screw 79. Upward flexing of the spring 81 by downward pressure on the lever 27, after spring 81 engages member 83, permits the lever 27 and shaft 15 to have continued downward movement beyond the low fire limit.

The operation of the control device is as follows: This control device is particularly adapted for supplying liquid fuel of low specific gravity, such as gasoline, to liquid fuel burners to be used in sub-zero temperatures which may run as low as minus 60° F. With the inlet passageway 3 connected at the threaded portion 4 to a liquid fuel supply tank providing a liquid head, preferably of about 30 inches, the outlet passageway 38 connected to the burner, and the lever 27 against the high fire stop 79, then if the metering valve 45 has not been adjusted to provide a desired flow to the burner of, say 9 cc. per minute at an ambient temperature of the air and liquid of about 70° F., with the float member 14 maintaining the liquid level at the line L, thereby providing say a quarter inch head of liquid above the chamber outlet or seat member 42, the control device is adjusted as follows: With the cover member 56 removed, the inlet valve 11, when the ambient is 70° F., is manually held against its seat by direct manual pressure thereon, and the high or maximum fire adjustment screw 79 is adjusted to raise or lower the fulcrum pin 16 until a point on a diametral line of the top surface of the float member 14, which line is parallel to pin 16, is a predetermined distance below the top edge of the chamber side wall such that after the valve member 11 is released, there will be a one quarter inch liquid head on the chamber outlet. Since the metering valve 45 is carried by the lever 27, this adjustment of lever 27 by the screw 79 will also adjust the metering valve 45 relative to its seat member 42. Now, the inlet valve 11 being released, if it is found that with the liquid head at the desired height of one quarter inch, the flow through the seat member 42 and from the outlet 38 is less than the desired flow of say 9 cc. per minute, then the adjustment screw 64 is turned up or down to adjust the position of the metering valve 45 relative to the lever 27 and to its port through the seat member 42. The minimum or low fire adjustment screw 83 is also adjusted to provide the desired low flame at the burner, this adjustment, of course, being made when the spring 77 is below center and the stop 81 is engaging the stop flange of the screw 83. It may be noted that a lower than customary flame or fuel flow can be maintained with this control device by reason of the ability of the attendant to clean the orifice or port in the seat member 42 by merely pushing downward on and then releasing the metering valve 45, thus flexing the spring stop 81 and forcing the orifice cleaning portion 46 through the seat member orifice to clean out any dirt, wax or ice crystals which may have accumulated. The control device being ready for operation, the burner can now be flooded or primed by lifting or pulling upward on the metering stem 49 which will pull the stop 80 up against the high fire screw 79 and will thereafter flex the supporting leaf spring 59, thereby permitting the valve portion 47 to be withdrawn from its seat member orifice beyond its high fire position and for a greatly increased flow of fuel to the burner. This upward or priming movement does not withdraw the pin 51 from the vertical portion of the bayonet slot and therefore when the stem 49 is released, the metering valve 45, under the force of leaf spring 59, seeks and rests in its high fire position. At the above maximum fire rate of flow to the burner, the inlet valve 11 will be maintained about .006 of an inch off its seat by the float member 14 so that there will be a continuous substantially constant rate of flow to and through the chamber 2, while the burner is in operation at a given ambient temperature. If the temperature of the ambient drops or decreases, then the bimetal lever portion 22 will contract to lift the inlet valve 11 relative to the 70° F. constant liquid level line corresponding to the full line position of the float member, Fig. 6, to provide a greater rate of inflow to the chamber 2, thereby increasing the head of liquid on the chamber outlet to compensate for the increased viscosity or density of the liquid fuel. The upward movement of the valve 11 by the bimetal member or portion 22 will result in the float member 14 rising with the increased liquid level, thereby depressing the valve 11 to throttle the inlet to the chamber 2. When the temperature of the ambient has decreased to say 60° below zero, then the bimetal portion 22 will have contracted until the float member 14 takes the position shown in dash dot lines in Fig. 6, which will not only raise the valve-adjacent upper corner of the float member 14 but will tilt or rock the float member 14 relative to the valve member 11 and to the normally horizontal liquid level line. It will be apparent that as the temperature decreases from 70° F. above zero, the bimetal portion 22 and the float member 14 will be correspondingly shifted or moved toward the dash dot line position of Fig. 6, thereby gradually increasing the liquid level in the chamber 2, until, at the minus 60° F. temperature, the level will have been increased substantially to the line L', see Fig. 2, thereby providing a liquid head of substantially $\frac{7}{16}$ inch. This increase in liquid head will also in part be caused by the reduction in the force of the float member acting against the liquid head from the supply tank by reason of the shortening of the lever arm to the length X Fig. 6 from the 70° F. length Y, which is the length between the shaft 16 and the center of buoyancy of the float member. It is desirable that the increasing liquid head shall not compensate fully for the increasing viscosity so as to maintain a constant rate of flow from the outlet 38 as the temperature decreases or when the temperature holds at a new level, because a slightly decreasing flow rate from the outlet can provide full heat output compensation at the burner by reason of the increase in the viscosity of the liquid fuel, since the more dense the liquid fuel becomes, the greater the B. t. u. content of the fuel for any given quantity. If the temperature of the fuel and air increases to say 100° F. above zero, then the float member 14 will take the dotted line position, Fig. 6, to maintain a lower constant liquid level in chamber 2 and the bimetal member will have expanded to increase the lever arm to a length indicated at Z which increases the force of the float member on the inlet valve.

If it is desired to reduce the burner flame to pilot or low fire, then the stem 49 is manually depressed or moved downward which acts through the spring 58 and leaf spring 59 to move the lever 27 downward against the upward component of force of the compression spring 77. Before the resilient stop member 81 engages the stop screw 83, the spring 77 will be moved over-center, so that the combined downward component of spring 77 and the force of spring 58 will hold the lever 27 in its minimum flow position with stop 81 against screw 83. This downward movement of the lever 27 will establish a new position for the metering valve portion 47 and will also move the inlet valve fulcrum pin 16 downward in its guide slots 24 from the position "a" for high fire to the position "b" so that there will be simultaneously provided a new and decreased liquid head on the outlet of chamber 2 and a reduced effective flow area through the seat member 42. The positioning of the pin 16 at the level "b" will move the float member 14 downward to the position indicated by the dash-dot line "S," Fig. 2, and establish the liquid level at the line L². The bimetal lever portion 22 will function in this new position of the valve fulcrum 16 to compensate for temperature changes in the same manner as described above.

If it is desired to shut off the burner, then the stem 49 is moved further downward, compressing the spring 58 against the opposing force of the low fire stop spring 81 and flexing the spring 81 so that the fulcrum pin 16 is moved further downward in its guide slots 24 until the center line of the pin 16 reaches the horizontal line "c" when the float member 14 will have been moved to the dash-dot line "t," Fig. 2, and be in engagement with the bottom wall of chamber 2, the valve 11 being simultaneously seated with washer 48 against the seat member 42. In order, however, to lock the inlet valve 11 in closed position, the pin 50 must pass below and be rotated to lie under the bayonet slot shoulder 53. This further downward movement of the metering valve stem 49 will further compress the springs 58 and 81 and will flex the bimetal portion 22 against its inherent resilience even when contracted by the minus 60° F. sub-zero temperature, bringing the fulcrum pin 16 say to the line "d" and therefore the float member 14 and the inlet valve 11 will be resiliently urged against the bottom casing wall and the inlet valve seat respectively so that vibration or jarring of the casing 1 will not cause movement of any part. Upon movement of the locking pin 50 downward to underlie the shoulder 53, the cylindrical metering valve portion 46 will have been moved through its valve seat aperture, thereby cleaning the seat port of any foreign matter or wax which may have separated out of the fuel. The positioning of the pin 50 to underlie shoulder 53 will have compressed the valve disc 48 against the seat member 42, thereby sealing the outlet passageway 38. The valve stem 49 may now be rotated either clockwise or counter-clockwise to position the pin 50 under either shoulder 53 of the bayonet slot, thereby wiping the top face of seat member 42 and locking the inlet and outlet valves in closed position.

The control device may be readily disassembled and assembled in the field as follows: After taking out the cover member screws 69, the cover member 56 is removed, it being freely slidable off the metering valve stem 49. Then the bracket holding screw 75 is removed and the bracket 71 is lifted in its guide slots, thereby lifting the lever 27 in a clockwise direction, the elongated leaf spring aperture 61 and the lever aperture 54 permitting this movement. The lever 27 is now held in this up position and the metering stem 49 is lifted against the force of the coil spring 58 and the leaf spring 59, so that the pin 51 will clear the top of the stem guide member 36. The stem 49 can now be rotated to bring the pins 50, 51 in line with the slot 62, thereby permitting withdrawal of the metering valve through the apertures 61 and 54. The lever 27 can now be rotated further upward, lifting the inlet valve 11 as the bearing pin 16 moves upward in the guide slots 24. When the valve 11 has been withdrawn from its guide member 9 and the bearing pin 16 has been lifted out of the slots 24, then with the float member 14 clearing the top of the guide member 36, the lever 27 can be moved to the left facing Fig. 2 so that the fulcrum slots 29 are removed from the bearing shaft 30. The disassembly will result in three subassemblies, namely the bracket 71, the metering valve 45 and the lever 27. In these subassemblies, the bracket 71 will be carrying the spring 77, the metering valve 45 will be carrying the spring 58 and washer 63, and the lever 27 will be carrying the float member 14 and the inlet valve 11. If it is desired to disassemble the subassembly of the lever 27, this may be readily done by pushing out the bearing pin 16 and snapping the valve 11 out of its supporting slots 18 in the lever 15. Reassembly of the control device will be apparent from the foregoing steps of disassembly but it might be noted that with the float member positioned to pass over the guide member 36, the slots 29, aided by the cam portions 33 of the ears 28, are positioned to slide onto the bearing shaft 30 and then the lever 27 is rotated downward counterclockwise to bring the ends of the float member supporting pin 16 into the guide slots 24 so that the inlet valve 11 hanging vertically will pass into its guide member 9. The lever 27 is held in an up position sufficient to permit the pin 51 of the metering valve to clear the top of the guide member 36 and the metering valve 45 is then inserted through the aperture 54 and slot 62 when it may be rotated to the position shown in Fig. 2. Continued downward movement of the lever 27 is now had and then the coil spring 77 is seated against the lever abutment 76 and the bracket 71 is positioned downward into its seating position as in Fig. 2 and the holding screw 75 is screwed in place. The cover member 56 may now be secured in position and the control device is ready for operation.

Referring to Fig. 7, the control device here illustrated is constructed for only two metering valve positions, namely maximum or normal fire position and burner off or valve closed position. The low fire adjustment screw 83 is eliminated and likewise the resilient stop member 81, described above, and the coil spring receiving end portion of the main lever 27 is bent or inclined upwardly, as at 100, so that when the metering valve 45 is moved downward to off position such that the pin 50 can be rotated under the shoulders 53, the lever engaging coil spring 77 will not be moved over or below its center line position. The spring 77 will therefore be continually exerting an upward component of force on the lever 27, even when the metering valve is in its closed and locked position. The operation of the control device with the change as in this Fig. 7 and the adjustment of the same for high or maximum burner flame is the same as above described in connection with the device of Fig. 2. It is therefore unnecessary to again describe the operation, as the only change is the elimination of the low fire setting or position of the parts, except that the metering valve and float position will automatically move to high fire position upon release of the pin 50 from beneath the shoulder 53.

In Fig. 8 there is shown another form of locking means for holding the inlet valve closed and which also is useful to maintain the inlet valve and float member against vibration or movement during transportation, thereby avoiding wearing of the parts which may render the device unfit for use upon arrival at its destination. The inlet valve 11 controlling the inlet port 10 is connected to the float member 14 by a lever arm 120 which may, if desired, be of a construction similar to the lever 15 of Fig. 2, a fulcrum or pin 121 being provided for the lever arm 120. Mounted on the cover member 56 there is a tubular guide member 122 alined with an aperture through the cover member 56 and in which there is reciprocable a manually operable pull rod 123 having a guide and latching finger or pin 124 which, upon rotation of the rod 123, is seatable upon a guide member shoulder 125 to hold the rod 123 in an up position. The rod 123 carries an abutment member 126 having an end portion 127 reciprocally guided in a chamber 128 in the inner end portion of the rod 123 and supported against downward movement by a helical coil spring 129. The abutment member 126 has a horizontal arm 130 engageable with the underside of the float member 14, such that when the pin 124 is on the shoulder 125 the spring 129 will be under compression, thereby holding the inlet valve 11 tightly against its seat and the float member 14 in an upward locked position, tensioning the lever arm 120. The float member 14 and inlet valve 11 can be released for operation by rotating the rod 123 to position the pin 124 in line with the guide member slot 131 and then moving the rod 123 downward into the chamber 2. It will be apparent that this locking means of Fig. 8 will be found useful in other forms of float controlled liquid level devices than that shown in Fig. 2.

This application is a division of my copending application Serial No. 512,716, filed December 3, 1943, for Flow Control Means, now Patent 2,427,059, granted September 9, 1947.

What is claimed and is desired to be secured by Letters Patent of the United States is:

1. A liquid flow controlling device, comprising a constant level chamber having an inlet and an outlet, a longitudinally reciprocable metering valve controlling said outlet, a lever supporting said valve, a spring acting on said lever and tending to move said valve to increase the flow from said outlet, a stop engageable by said lever to limit its movement by said spring, and a lost-motion connecting between said valve and said lever for opening movement of said valve beyond the limit of said lever by said stop.

2. A liquid flow controlling device, comprising a constant level chamber having an inlet and an outlet, a longitudinally reciprocable metering valve controlling said outlet, a lever, a movable member resiliently held in fixed position on and carried by said lever, means securing said valve to said movable member, a spring acting on said lever and tending to move said valve to increase the flow from said outlet, and a stop engageable by said lever to limit its movement by said spring, said movable member providing lost-motion movement of said valve relative to said lever for opening movement of said valve beyond the limit of said lever by said stop.

3. A liquid flow controlling device, comprising a constant level chamber having an inlet and an outlet, a vertically reciprocable metering valve controlling said outlet, an adjustment lever, a spring acting on and urging said lever in a valve opening direction, a stop to limit movement of said lever by said spring, a leaf spring secured at one end to and extending along said lever, an abutment member limiting movement of said leaf spring relative to said lever in valve closing direction, said valve having a stem extending beyond said leaf spring, a shoulder on said stem engaging the valve side of said leaf spring, a coil spring surrounding said stem and held under compression between said stem and said leaf spring to hold said shoulder against said leaf spring, and means to limit movement of said lever in a valve closing direction, said leaf spring and said coil spring providing for overtravel of said valve in opposite directions when said lever is limited by said stop or by said limiting means respectively.

WALTER S. LANDON.

REFERENCES CITED

The following references are of record in the file of this patent:

UNITED STATES PATENTS

| Number | Name | Date |
|---|---|---|
| 973,551 | Osborne | Oct. 25, 1910 |
| 1,637,230 | Mueller | July 26, 1927 |
| 1,730,497 | Fisher | Oct. 8, 1929 |
| 2,129,937 | Johnson | Sept. 13, 1938 |
| 2,186,128 | Ullstrand | Jan. 9, 1940 |
| 2,199,538 | Curry | May 7, 1940 |
| 2,332,556 | Breese | Oct. 26, 1943 |

FOREIGN PATENTS

| Number | Country | Date |
|---|---|---|
| 309 | Great Britain | Dec. 31, 1914 |